Patented July 18, 1939

2,166,698

UNITED STATES PATENT OFFICE 2,166,698

PROCESS OF MAKING NITRITE ESTERS OF POLYHYDROXY ALIPHATIC COMPOUNDS

Clyve Allen, Berkeley, Calif., assignor to Shell Development Company, San Francisco, Calif., a corporation of Delaware No Drawing. Application September 17, 1937,
Serial No. 164,421

10 Claims. (Cl. 260—466)

The present invention is particularly concerned with the production of novel polynitrite esters containing a hydrophile group.

The invention also concerns the production of polynitrite esters obtained by the complete esterification of polyhydroxy compounds.

Further, the invention concerns the production of mononitrite esters containing a hydrophile group.

In an organic compound, the replacement of an —ONO group for an —OH group results, among other things, in an increased reactivity, decreased stability, lesser solubility in water and an increase in density. For example, the nitrite esters of the aliphatic monohydric alcohols are only slightly soluble in water, deteriorate on storage, etc. The further substitution of a second nitrite group for a hydroxy group results in a magnification of these qualities. For example, the polynitrite esters are very reactive substances, even reacting vigorously with water at ordinary temperatures. They likewise deteriorate on storage, are water insoluble and have a density considerably greater than their corresponding alcohols.

Due to their increased reactivity, these polynitrite compounds are much superior to the well known mononitrite esters for many purposes. For example, they are much stronger nitrosating agents. The novel nitrite esters with which the present invention is concerned have particular value in organic synthesis, since through their use a wide variety of useful and, in some cases, novel compounds may be prepared.

Due primarily to the reactivity of the polynitrite esters with water, it has been deemed necessary to prepare them in an anhydrous system. This may be accomplished in a few instances by passing nitrous anhydride into the anhydrous polyhydroxy compound. Since in this method the extent of esterification is not controllable, the method is not applicable to the preparation of the many novel nitrite esters containing a hydroxy group. Likewise, the formation of oxidation products usually makes it necessary to separate the desired product by distillation, which, in general, gives a poor yield, and in many cases is an exceedingly difficult, if not impossible operation.

I have found that by allowing only a limited contact with water, many polynitrite compounds may be prepared in an aqueous medium, and that this method has certain distinct advantages.

According to the present invention, the polyhydroxy compound to be esterified is contacted with nitrous acid in an aqueous medium, and the desired nitrite ester is removed substantially as soon as formed.

By making use of the marked change in solubility of a compound brought about by the esterification of a hydroxyl group, i. e., by substituting a nitrite group for a hydroxy group, the desired product may be removed from the aqueous solution as soon as the desired number of hydroxyl groups have been esterified. Thus, under suitable conditions, the desired nitrite, which is insoluble in the aqueous medium, collects in droplets substantially as soon as formed, and having a different density than the aqueous medium, collects in a layer which can be easily removed.

Since the product is removed substantially as soon as formed, there is little tendency to nitrite further than desired, and since the next lower nitrite is soluble in the aqueous medium, it is not removed; therefore, the nitrite esters prepared according to the present invention are usually of sufficient purity to allow their use without further purification treatment. The chief and only significant impurity present is a small amount of lower nitrited product which is extracted by the desired nitrite before its removal from the aqueous medium. This impurity, if desired, may be removed by fractionation, preferably under vacuum, but since it is usually present in only small amounts and is, moreover, one of the products of natural decomposition on ageing, this purification step is seldom necessary.

I have found that the degree of esterification, and consequently, the purity of the product can be governed considerably by adjusting the aqueous medium so as to throw the desired product out of solution as soon as the desired degree of nitrition has taken place. This may be accomplished by adding a salt to the solution to lessen the solubility or by adding acetic acid to increase the solubility. Thus, in any given case the addition of a soluble salt to the aqueous medium will favor the separation of a lower nitrited product, and conversely, the addition of acetic acid to the aqueous medium will favor the formation of a more highly nitrited product.

I have found that the amount of decomposition due to reaction with the aqueous medium is materially lessened as the temperature is decreased, and I therefore prefer to execute my invention at a relatively low temperature. Temperatures from the freezing point of the aqueous medium up to about room temperature (25° C.) are preferably employed. Under these conditions, the short period of contact with water afforded by the present method does not result in a series decomposition of the product, and since the products of reaction are almost exclusively nitrous acid and the next lower nitrite (or the parent hydroxy compound), the small amount of decomposition that does occur does not result in a loss of reagents.

The nitrous acid required for the reaction may be generated in the aqueous medium, if desired, by first dissolving therein a quantity of a suitable soluble nitrite, such as NaNO₂, KNO₂ Ca(NO₂)₂, etc., and slowly adding thereto an acid, such as HCl, H₂SO₄, H₃PO₄, acetic acid, etc. Conversely, a solution of the nitrite may be added to the acid aqueous medium. Other methods are equally applicable; thus, for example, nitrous anhydride may be bubbled into the aqueous medium. This latter method has certain advantages, since by this means the process is easily executed in a continuous manner, nitrous anhydride and the polyhydroxy compound being continually added to the aqueous medium and the product being continually withdrawn. This method likewise eliminates the concentration of salts in the aqueous medium, which concentration in some cases is not desirable.

The polyhydroxy compound may be added to the aqueous medium either at once, intermittently or continually.

According to the present invention, nitrite esters may be produced from a great number of compounds containing a plurality of hydroxy groups. In general, any non-phenolic organic compound containing a plurality of hydroxy groups which is in itself appreciably soluble in an aqueous solution, but which becomes insoluble in said aqueous solution upon having one or more of its hydroxy groups esterified with nitrous acid, may be employed in the present method. The term "non-phenolic organic compound" is used to exclude those compounds of phenolic character, i. e., having hydroxyl groups attached directly to a benzene nucleus. Such phenolic compounds, under the preferred conditions of the present process, do not esterify in the above sense, but are oxidized by the nitrous acid. For example, the following compounds may be used to prepare polynitrite esters containing a hydroxy group: glycerine alpha methyl glycerine, beta methyl glycerine, 1,2 dimethyl glycerine, 1,3 dimethyl glycerine, pentaerythritol, methyl tricarbinol methane, erythritol, erythritol mono acetate, erythritol mono ethyl ether, erythritol monochlorhydrin, hexyl erythritol, etc. Polynitrite esters in which the hydroxy groups are completely esterified may be produced from the more hydrophilic polyhydroxy compounds. The following compounds are representative examples. Ethylene glycol, propylene glycol, trimethylene glycol, isobutylene glycol, beta butylene glycol, alpha methyl trimethylene glycol, beta methyl trimethylene glycol, diethylene glycol, glycerine mono ethyl ether, glycerine mono acetate, beta methylene trimethylene glycol, erythritol dichlorhydrin, etc.

Certain mononitrites containing a hydroxy group may be produced, if desired, by choosing polyhydroxy compounds of more hydrophobic character, such as, for example: octylene glycol, 1,2 dipropyl propylene glycol, beta pentyl trimethylene glycol, tributylene glycol, glycerol mono butyrate, glycerol mono amyl ether, quinite, etc.

While I have particularly referred to hydroxy groups, it is to be understood that an unesterified hydroxy group may be replaced by a carboxylic acid group. Thus, for example, the following compounds are suitable: erythroglucic acid, dihydroxy propyl malonic acid, mono methyl tartrate, dimethyl racemic acid, glutaric acid, adipic acid, dihydroxy maleic acid, etc.

While the above are representative examples of suitable polyhydroxy compounds, the invention is not limited to these particular examples, since such homologues, analogues and derivatives of the above as fulfill the necessary solubility requirements may also be used.

Substances such as sucrose, having a considerable number of hydroxy groups are not applicable per se if they do not fulfill the solubility requirements. Thus, since sucrose has eight esterifiable hydroxy groups, it would be necessary to esterify approximately five of them before the polynitrite would become insoluble in even a concentrated salt solution, and such a polynitrite is not in itself capable of more than a momentary existence. Sucrose, to which has been added a suitable hydrophobe group, such as an alkyl group may, however, be nitrited in accordance with the process of the invention.

The following example is presented solely to illustrate a suitable application of the invention and a mode of executing the same. It is not to be considered as limiting the scope of the invention as to the reactants, mode of execution and the like.

*Example*

A solution of sodium nitrite, ethylene glycol and water in a separatory funnel was brought to about 0° C. To the solution there was added dropwise an amount of hydrochloric acid equivalent to the amount of sodium nitrite taken while the contents of the separatory funnel were maintained at near 0° C. and gently swirled. After a few minutes of hydrochloric acid addition, a light yellow oil began to separate out and, collecting to small droplets, quickly settled to the bottom of the separatory funnel. The oily layer collected at the bottom was drawn off into a receptacle containing anhydrous sodium sulfate. The product was substantially pure glycol dinitrite. Density 0° C. 1,211.

The following novel compounds, prepared in an analogous manner, illustrate further applications of the present invention:

| Name | Density 0°C. |
|---|---|
| Glycerine dinitrite | 1.319 |
| Isobutylene glycol dinitrite | 1.078 |
| Beta butylene glycol dinitrite | 1.088 |

The glycerine dinitrite was probably a mixture of 1.2 and 1.3 dinitrite. The isobutylene glycol dinitrite as thus prepared was remarkably reactive.

The nitrite esters prepared are yellow oils immiscible in water but soluble in the usual organic solvents. They react rapidly with ethyl alcohol to form ethyl nitrite and are energetic nitrosating agents. Many of the compounds in question may be advantageously used in the manufacture of dyestuffs, in the preparation of various esters of the acids of silicon, phosphorous, arsenic and sulfur and to many other syntheses. Other uses, such as proknock agents for Diesel fuel, etc., may be realized.

Having described my invention in its preferred embodiment, and having given specific examples for the purpose of illustrating its use, it will be understood that modifications will be obvious to those skilled in the art, and I do not therefore wish my invention to be limited except by the scope of the sub-joined claims, as interpreted in the light of the generic spirit of my invention.

I claim as my invention:

1. A process for the production of nitrite esters of open-chain saturated aliphatic compounds which comprises reacting an appreciably water-soluble open-chain saturated aliphatic compound containing a plurality of esterifiable carbinol groups with nitrous acid in an aqueous medium, and removing a nitrite ester from the reaction system substantially as soon as it is formed therein.

2. A process for the production of nitrite esters of open-chain saturated aliphatic compounds which comprises reacting an appreciably water-soluble open-chain saturated aliphatic compound containing a plurality of esterifiable carbinol groups with nitrous acid in an aqueous medium, and removing the separated nitrite ester from the reaction vessel substantially as soon as formed therein.

3. A process for the production of nitrite esters of open-chain saturated aliphatic compounds which comprises reacting an appreciably water-soluble open-chain saturated aliphatic compound containing a plurality of esterifiable carbinol groups with nitrous acid in a fluid aqueous medium at a temperature below 25° C., and removing a nitrite ester from the reaction mixture substantially as soon as formed therein.

4. A process for the production of nitrite esters of open-chain saturated aliphatic compounds which comprises reacting an appreciably water-soluble open-chain saturated aliphatic compound containing a plurality of esterifiable carbinol groups with nitrous acid in a fluid aqueous medium at a temperature below 25° C., and removing the separated nitrite ester from the reaction vessel substantially as soon as formed.

5. A process for the production of nitrite esters of open-chain saturated aliphatic compounds which comprises reacting an appreciably water-soluble open-chain saturated aliphatic compound containing a plurality of esterifiable carbinol groups with nitrous acid in an aqueous medium, and removing a polynitrite ester from the reaction system substantially as soon as it is formed therein.

6. A process for the production of nitrite esters which comprises reacting an appreciably water-soluble open-chain saturated aliphatic compound containing a plurality of hydrophile groups selected from the class consisting of carbinol and carboxyl groups, at least one of which is a carbinol group, with nitrous acid in an aqueous medium whereby at least one carbinol group is esterified to form a nitrite ester containing at least one hydrophile group, and removing said nitrite ester from the reaction system substantially as soon as formed.

7. A process for the production of nitrite esters which comprises reacting an open-chain saturated aliphatic polyhydric alcohol with nitrous acid in an aqueous medium and removing the separated nitrite ester from the reaction vessel substantially as soon as formed.

8. A process for the production of nitrite esters which comprises reacting an open-chain saturated aliphatic glycol with nitrous acid in an aqueous medium and removing the separated nitrite ester from the reaction vessel substantially as soon as formed.

9. A process for the production of a polynitrite ester of glycerol which comprises reacting glycerol with nitrous acid in an aqueous medium and removing the separated nitrite ester substantially as soon as formed.

10. A process for the production of nitrite esters which comprises the steps of continuously introducing an open-chain saturated aliphatic polyhydric alcohol and nitrous anhydride into an aqueous reaction medium maintained at a temperature below 25° C. and removing the separated nitrite ester substantially as soon as formed.

CLYVE ALLEN.